United States Patent [19]

Rüdiger

[11] Patent Number: 4,707,037

[45] Date of Patent: Nov. 17, 1987

[54] LOAD-DEPENDENT BRAKE PRESSURE REGULATOR

[75] Inventor: Eckhart Rüdiger, Ebern, Fed. Rep. of Germany

[73] Assignee: FAG Kugelfischer Georg Schafer (KGaA), Fed. Rep. of Germany

[21] Appl. No.: 810,645

[22] Filed: Dec. 18, 1985

[30] Foreign Application Priority Data

Dec. 19, 1984 [DE] Fed. Rep. of Germany ....... 3446270

[51] Int. Cl.⁴ .............................................. B60T 8/18
[52] U.S. Cl. ................................... 303/22 R; 188/195
[58] Field of Search ................. 303/22 R, 22 A, 6 C, 303/23 R, 23 A, 6 R; 188/195, 349

[56] References Cited

U.S. PATENT DOCUMENTS

| | | | |
|---|---|---|---|
| 3,773,367 | 11/1973 | Osborne et al. | 303/22 R |
| 3,802,750 | 4/1974 | Kawai | 303/22 R |
| 4,142,764 | 3/1979 | Kawaguchi | 303/22 R X |
| 4,198,101 | 4/1980 | Oberthur | 303/22 R |

FOREIGN PATENT DOCUMENTS

| | | |
|---|---|---|
| 1780560 | 2/1972 | Fed. Rep. of Germany . |
| 2708941 | 9/1978 | Fed. Rep. of Germany . |
| 2812828 | 10/1978 | Fed. Rep. of Germany ...... 188/195 |
| 3222614 | 12/1983 | Fed. Rep. of Germany . |
| 1547785 | 6/1979 | United Kingdom ............ 303/22 R |

Primary Examiner—Andres Kashnikow
Assistant Examiner—Robert J. Oberleitner
Attorney, Agent, or Firm—Ostrolenk, Faber, Gerb & Soffen

[57] ABSTRACT

A brake pressure regulator for hydraulic brake systems of vehicles, which controls the required braking pressure on the rear axle as a function of the distribution of the axial load, in such a manner that no overbraking of the rear axle takes place. The regulator comprises an actuating piston for receiving an input brake pressure and in response generating a first force; a spring beam and a support for engaging the spring beam, the spring beam being adjustable in response to the vehicle load distribution for receiving the first force and in response generating a second force related to such vehicle load distribution according to a predetermined function corresponding to a degressive curve, the spring beam and the support being shaped to determine the predetermined function; and a control piston for receiving the second force and in response generating an output brake pressure.

11 Claims, 6 Drawing Figures

LOAD-DEPENDENT BRAKE PRESSURE REGULATOR

BACKGROUND OF THE INVENTION

1. Field of the Invention

The present invention concerns a brake pressure regulator for the hydraulic brake system of a vehicle, which self-adjusts as a function of load, and has a radiating field of continuous characteristic curves that are determined by loading and other parameters of the vehicle, the radii of these curves being non-linear and degressive, i.e. downwardly concave.

2. Background Art

Upon the braking of an automotive vehicle the portion of the weight of the vehicle that is shifted forward from the rear axle toward the front axle increases with increasing braking time. Optimal braking is obtained when front and rear axles utilize the same locking force for the existing road conditions and the existing speed. This is the case when both axles remain in the transition region toward locking during the entire braking process. Since over-braking of the rear axle, i.e. locking the rear wheels with the front wheels not yet locked, must be avoided because of unstable travel behavior—danger of skidding, unfavorable influence on the steering—a brake pressure regulator must be employed to ensure that the braking force on the rear axle is never greater than the ideal braking force.

Solutions have been proposed, for instance in Federal Republic of Germany OS 27 08 941, which attempt to approximate the actual braking-force distribution to the ideal in accordance with the step-up piston principle, by which the brake pressure regulator produces a main characteristic curve which includes a family of bent lines whose points of inflection are variable as a function of the load. The performance of such a regulator in actual use is far from the ideal situation mentioned above.

Another proposed braking pressure regulator, which is known from Federal Republic of Germany OS 17 80 560, operates in accordance with the balance beam principle, the effective lever lengths of balance beam which cooperates with two pistons being automatically varied as a function of the load of the vehicle. This regulator has a field of characteristic curves including a family of straight lines whose slopes are variable as a function of the load. In actual use such a regulator is even more remote from the ideal braking force distribution, because of the braking force distribution obtained.

In Federal Republic of Germany OS 32 22 614 there is shown another proposed brake pressure regulator for producing load-dependent non-linear and continuous characteristic curves. To attempt to achieve the ideal brake pressure characteristic curves, this document provides a construction having pistons axially displaceable with respect to each other, and a pressurized air or gas column which determines the characteristics of the curves. As seen in the figures in this document, the actual mechanical characteristics of the essential pistons, the seals that are required, and the frictional forces inherent therein, are not taken into consideration. One major factor which negatively impairs the function of the proposed device and is difficult to control is the polytropic exponent, which is a function of the temperature. As a result, the pre-established characteristic curve of the vehicle brake changes continuously, for instance as a passenger car travels through a mountain pass in summer, or during the course of the seasons. Furthermore, the displacement path of the air- or gas-compressing piston changes as a measure of the degree of load, which would require continuous adjustment of the pressure regulator.

SUMMARY OF THE INVENTION

It is therefore a general object of the invention to provide an improved hydraulic brake pressure regulator, particularly a regulator whose field of characteristic curves can be adapted as closely as possible to the ideal braking force distribution, while avoiding the above-mentioned disadvantages of previously proposed solutions.

For this purpose, the balance beam of the brake pressure regulator may have the form of a spring beam, preferably of rectangular cross-section, and the support means for the spring beam may have a curved active surface. These two parts—the spring beam, which functions as a balance beam, and the curved active surface of its support—come into functional relationship through an actuating piston and a control piston which are urged by the hydraulic pressure developed in the braking process to bear upon the spring beam. Thus the support, which is displaced toward either the actuating piston or the control piston as a function of the distribution of the vehicle load, provides a curved active surface for engagement with the spring beam such that, as a result of rising braking pressure on the actuating piston, the spring beam is elastically deformed, and the points of support of the spring beam on the curved active surface shift continuously towards the actuating piston. The opposite end of the spring beam thereby bears upon the control piston which is displaced to operate a control valve. With an increasing input pressure $p_E$ there results a lever arm of decreasing length for the actuating piston and a lever arm of increasing length for the control piston, so that the output pressure $p_A$ on the control piston increases as the product of the reciprocal of the lever ratio multiplied by the input pressure $p_E$. This continuous change in the respective lever arms during the braking process has the result that an input pressure $p_E$ on the actuating piston from the master cylinder, which increases linearly, is maintained in equilibrium by a non-linearly increasing and degressive (downwardly concave) output pressure on the control piston. If the values obtained are recorded for a variety of axial load distributions of a given vehicle—outlet pressure $p_A$ as a function of the input pressure $p_E$—one obtains a degressively and continuously extending radiating field of characteristic lines which corresponds closely to the ideal braking force distribution.

The proposed invention thus provides a degressive characteristic curve which is the solution to the problems mentioned above. Further, the system of the invention can be realized without the practical problems that have been seen in the brake pressure regulators tested. These advantages can be obtained without any great manufacturing cost, and disturbing variables such as friction are clearly reduced in the present system.

According to an aspect of the invention, a load-distribution-dependent hydraulic brake pressure regulator comprises housing means; receiving means in the housing means for receiving pressurized hydraulic fluid from a master cylinder; transmitting means in the housing means for transmitting pressurized hydraulic fluid to a brake line; valve means for controllably intercommunicating the receiving means and the transmitting means to control the pressure of such transmitted hydraulic fluid; actuating piston means for receiving pressurized fluid from the receiving means and generating a first force in response thereto; balance beam means for receiving such first force and generating in response a second force; control piston means for receiving such second force and transmitting such second force to the valve means for controlling the same; and adjustment means for automatically adjusting the balance beam means in response to the vehicle load distribution such that such second force is related to such first force and to such vehicle load distribution according to a predetermined function.

According to another aspect, a load-distribution-dependent hydraulic brake pressure regulator for a vehicle comprises valve means operable to control an output brake pressure in a vehicle as a function of an input brake pressure; actuating piston means for receiving such input brake pressure and generating a first force in response thereto; balance beam means for receiving such first force and generating a second force in response thereto; control piston means for receiving such second force and transmitting such second force to the valve means for controlling the same; and adjustment means for automatically adjusting the balance beam means in response to the vehicle load distribution such that such second force is related to such first force and to such vehicle load distribution according to a predetermined function.

According to a further aspect, a load-distribution-dependent hydraulic brake pressure regulator for a vehicle comprises actuating piston means for receiving an input brake pressure and in response generating a first force; balance beam means adjustable in response to the vehicle load distribution for receiving such first force and in response generating a second force related to such vehicle load distribution according to a predetermined function; and control piston means for receiving such second force and in response generating an output brake pressure.

BRIEF DESCRIPTION OF THE DRAWINGS

Other objects, features and advantages of the invention will be seen in the following detailed description, taken together with the accompanying drawings, in which.

DETAILED DESCRIPTION OF PREFERRED EMBODIMENTS

Figure 1:
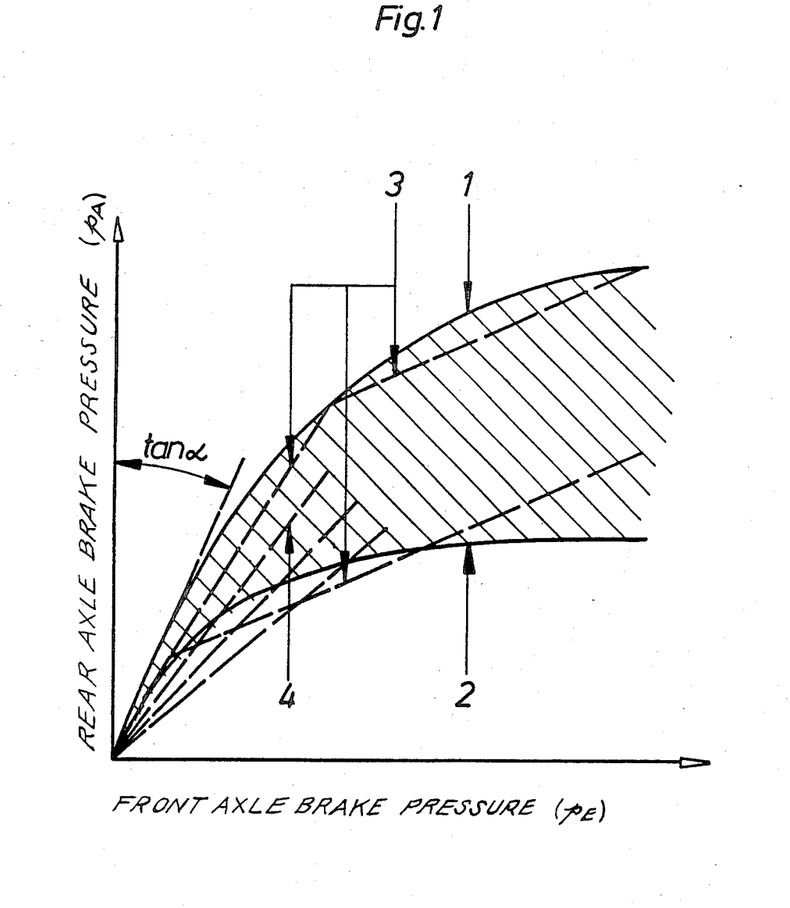
FIG. 1 is a field of characteristic lines showing an ideal brake force distribution and prior art brake force distributions.

FIG. 1 shows an ideal (degressive and continuous) radial characteristic-line field with the rear axle pressure $p_A$ of the brake pressure regulator 5 shown as a function of the input front axle pressure $p_E$, wherein the limiting characteristic line 1 applies to a fully loaded automotive vehicle and the limiting characteristic line 2 applies to a load consisting of the weight of the vehicle plus driver. For every other state of loading of the automotive vehicle there applies a separate line lying between these two boundary lines, the course of which can be derived from vehicle-specific data such as weight and position of center of gravity in accordance with known equations.

The dashed-line characteristic curves 3 indicate the operation of prior art load-dependent brake pressure regulators, which have merely a family of straight characteristic lines 4. In this case a slope corresponding approximately to the ideal course is established and an approximation thereto is obtained in operation by load-dependent bending of the straight lines.

Figure 2:
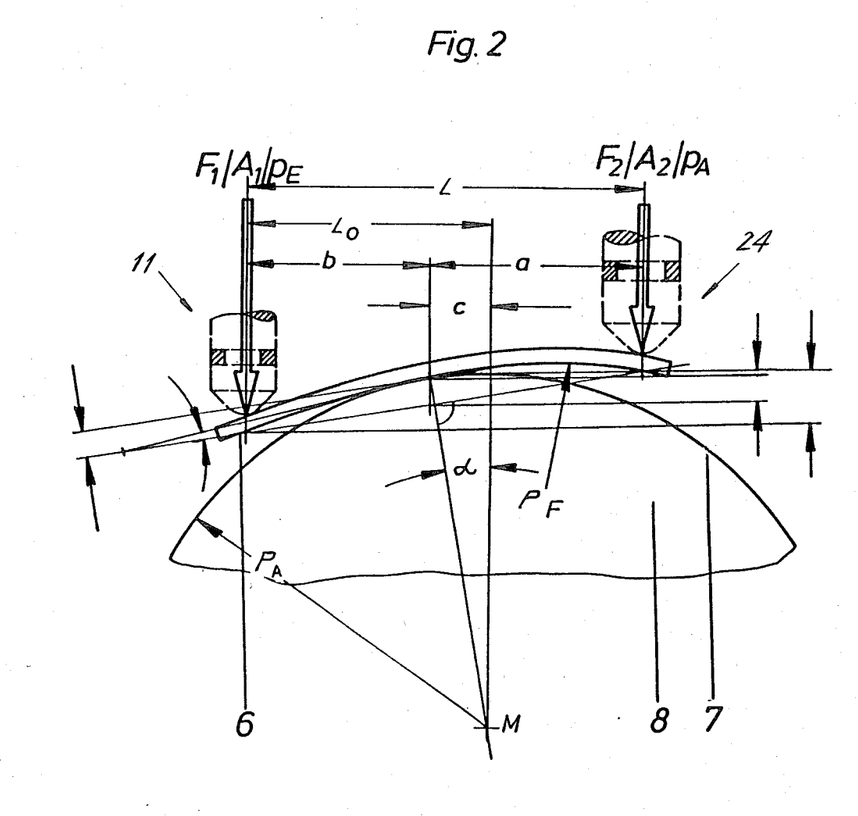
FIG. 2 is a simplified diagram of a first embodiment of a brake pressure regulator according to the invention.

FIG. 2 is a simplified theoretical diagram of a first embodiment of a load-dependent brake pressure regulator in accordance with the balance beam principle. A spring beam 6 rests on a support 8 having a curved surface 7. An actuating piston 11 and a control piston 24 near opposite ends of the spring beam 6 deform the spring beam 6 convexly by means of hydraulic pressure generated in the braking process. The theoretical model shown in FIG. 2 applies to the use of a band spring of constant rectangular cross-section. In accordance therewith, an actuating piston 11 having area $A_1$ and a control piston 24 having area $A_2$ are symbolized, together with the hydraulic pressures $p_E$, $p_A$ acting on them and the forces $F_1$ and $F_2$ thus produced. The distance between the two pistons 11, 24 is designated as measurement L, while the measurement $L_o$ is the distance between the actuating piston 11 and the point of contact of the spring beam on the support 8. The distance measurement L and the effective diameter of the pistons 11, 24 are variables by which the overall transmission behavior expressed by tan α (see FIG. 1), of the brake pressure regulator 5 may be initially set on the ideal curve, within the limits of structurally feasible dimensions.

The flat spring beam 6, which is unloaded in its initial position, acts as a double-armed lever having output and input lever arms a and b, respectively, and in initial position lies tangentially on the support a radial distance $p_A$ vertically above its center of curvature M. The length of the output lever arm a in the unloaded position is equal to $L-L_o$ and, as seen in FIG. 2, increases with increasing input pressure $p_E$ by measurement c. The measurement c represents the increase in the lever arm a as the spring beam 6 rolls over and adapts to the surface of the support 8 under the action of input pressure on the actuating piston 11. The radius of curvature of the loaded spring beam 6 at its output end is designated $p_F$. During operation of the brake pressure regulator 5 it is to be noted that upon reaching the locking pressure we have $p_F \geq p_A$.

Figure 3:
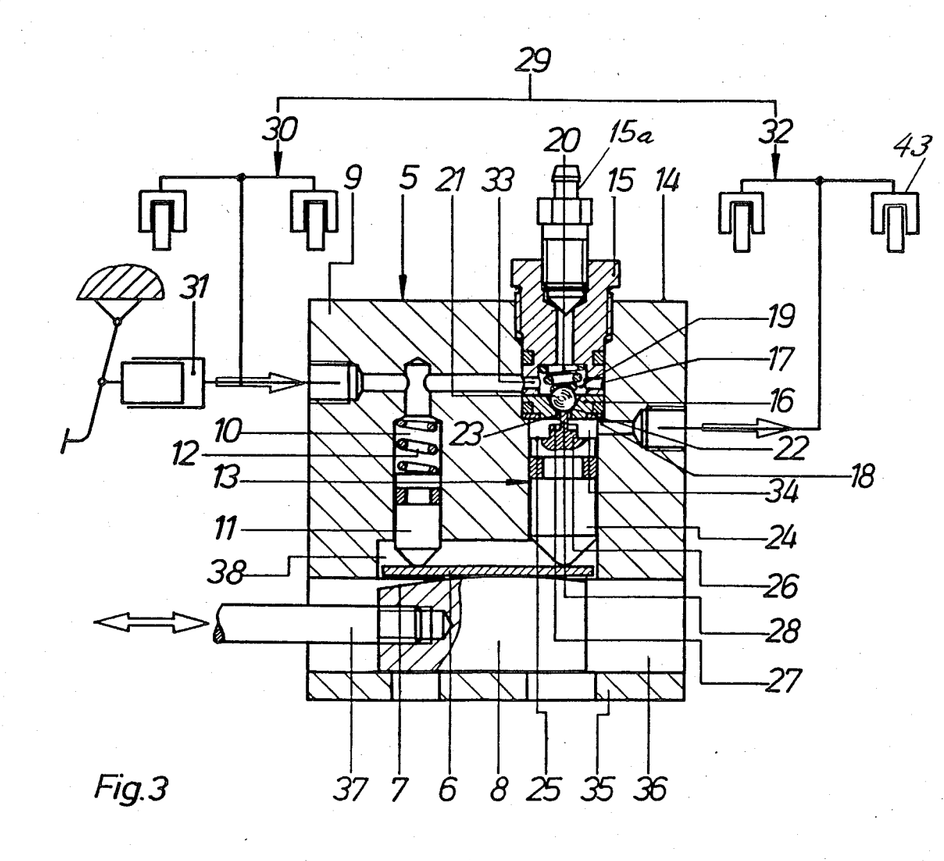
FIG. 3 is a cross-sectional view of the first embodiment.

In order to obtain the path of the ideal curve, the lever arm a must increase continuously by the amount c so as to follow a course corresponding to the size of the curve radius $p_A$. This results from the equation which applies for the steady-state equilibrium condition of the regulator.

$$p_E \cdot A_1 \cdot L = (p_E \cdot A_1 + p_A \cdot A_2) \cdot a \tag{1}$$

$$p_A = \frac{(p_E \cdot A_1 \cdot L)/a - p_E \cdot A_1}{A_2}$$

wherein
p.A=F
A = piston area
$p_E$ = input pressure on the regulator
$p_A$ = output pressure on the regulator
L = piston spacing
a = lever arm The above equation relates to well-known balance beam principles. In order to obtain a selected course of the pressure and force from the input pressure $p_E$ to the output pressure $p_A$ in the arrangement of the spring element 6 in FIGS. 2 and 3, the lever a of the spring element 6 must change non-linearly and continuously upon action by the input pressure on the actuating piston 11 corresponding to the pre-established curvature 7. This is achieved by using the arrangement of the spring beam 6 in the brake pressure regulator 5 according to the invention. For this course of the curve there applies the aforementioned condition that the spring path of the spring beam 6 with the radius $\rho_F$, for each case of load within the characteristic range of the pressure regulator 5, agrees with the segment height of the curve 7 having the radius $\rho_A$ of the support 8, and therefore $\rho_F \geq \rho_A$, and a continuous displacement of the spring beam support and thus a change in the lever ratio is possible. It should furthermore be noted that for the maximum input pressure $p_E$ established in accordance with the ideal curve or the force $F_1$ on the actuating piston 11, the spring beam 6 experiences its maximum deflection and therefore the point of support for this case of load is positioned on the support 8 insofar as possible in the position L/2.

From the geometric values explained above and which can be noted from FIG. 2, with suitable consideration of the band spring dimensions, which can also be preselected and are contained in the moment of inertia J, there is obtained the further functional relationship:

$$a = f(\rho_A, E, J, L, L_o, p_E, A_1) \quad (2)$$

wherein
E = modulus of elasticity of steel
J = moment of inertia of the spring beam
$\rho_A$ = radius of the rolling curve If equation (2) is now introduced into equation (1), it is seen that by increasing the lever arm "a" a corresponding change may be obtained in the output pressure $p_A$.

FIG. 3 shows a cross-section of a first embodiment of a brake pressure regulator 5 in accordance with the invention, including an arrangement of a spring beam 6 and a support 8 provided with a curved active surface 7. The pressure regulator 5 includes a housing 9 and a bottom 35. A cylindrical bore 10 is formed in the housing 9, with an actuating piston 11 sealed within the walls of the bore. The actuating piston 11 is acted upon by a compression spring 12 which bears on an upper shoulder of the cylindrical bore 10.

A stepped bore 13 in the housing 9, which is located parallel to the bore 10, has a screw plug 15 which is for insertion into the cover side 14 of the housing 9, and has a vent connection 15a. The screw plug 15 braces a valve seat 16 of a control valve 17 against a shoulder 18 within the stepped bore 13. Between the valve seat 16 of the control valve 17 and the screw plug 15, is a valve chamber 19. Arranged in the valve chamber 19 are the elements of the control valve 17, which is a non-lockable return valve. These elements include a compression spring 20, which acts on a valve body 21, the valve body 21 being pressed against a conical sealing seat 22 which is the upper portion of a centrally located passage 23 in the valve seat 16 of the control valve 17.

In a lower stepped smaller bore section of the stepped bore 13 is located a sealingly supported control piston 24. The control piston 24 has a collar projection 26, which has side channels 27 formed on its upper end surface 25. A ram 28 is formed as a narrow upward projection on the upper end surface 25.

These piston and valve components are arranged so that as the control piston is moved upward, its upper elements come to bear against the valve seat 16, while at the same time, the axial ram 28 projects through the passage 23 of the valve seat 16 and pushes the valve body 21 upward away from the conical sealing seat 22 and into the valve chamber 19.

In its working position, the closed control valve 17 separates a hydraulic line shown schematically at 29 into two sections: a front-axle line 30, including a master cylinder 31, and a rear-axle line 32. The front-axle line 30, which is acted on by an input pressure designated $p_E$, connects the bore 10 of the actuating piston 11 via channels 33 to the chamber 19. The rear-axle line 32 communicates the braking members 43 with a lower chamber 34 of the stepped bore 13 which is defined by the upper elements of the control piston 24, and by the lower surface of the valve seat 16 of the control valve 17.

Adjacent the bottom 35 of the housing 9 is formed a horizontally extending guide channel 36 having an upper recess 38, into an upper side of which the two bores 10 and 13 communicate at right angles. The lower ends of the actuating piston 11 and the control piston 24 are cambered and project downward into the recess 38.

The support 8 rests in the guide channel 36 and is horizontally displaceable therein by means of a pivot device 37 as a function of the axle load distribution of the vehicle. The upper side of the support 8 facing the two bores 10 and 13 is the above-described curved active surface 7. Between the curvature 7 on the support 8 and the cambered ends of actuating piston 11 and control piston 24, the above-described spring beam 6 is arranged as a horizontal balance beam. The spring beam 6 is preferably formed as a band spring of rectangular cross-section and is prevented from excessive horizontal movement by being loosely surrounded by the walls of the recess 38. The curvature 7 of the support 8 is so arranged, as shown in FIG. 2, that when the pressure of the actuating piston 11 on the spring beam 6 increases, the point of support of the spring beam 6 upon the support 8 moves in the direction toward the actuating piston 11.

The manner of operation of the brake pressure regulator of FIG. 3 is as follows:

Before the start of the braking process there is free passage for the braking fluid from the master cylinder 31 in the front-axle line 30, through the channels 33 and the passage 23 to the chamber 34, which communicates with the rear axle line 32. The control valve 17 is opened in the initial position because the compression spring 12, via the actuating piston 11 and the spring beam 6 which acts as a lever, holds the control piston 24 resting against the valve seat 16, in which case the ram 28 of the control piston 24 presses the spring-biased valve body 21 away from the conical sealing seat 22. The support 8 is displaced laterally by the pivot device 37 by a displacement corresponding to the vehicle load distribution, so that a step-up ratio which corresponds to the stationary condition of the vehicle is established by the lever action of the spring beam 6.

Upon commencement of braking, the hydraulic pressure $p_E$ produced by the master cylinder 31 acts on both the actuating piston 11 and the control piston 24. Under the action of the forces bearing on both pistons upon such increase in the pressure $p_E$, the control piston 24 and the actuating piston 11 are moved downward by respective distances which depend on the step-up ratio which has been established by the position of the spring beam 6, and the control valve 17 begins to close. In the front-vs.-rear pressure diagram of FIG. 1, this condition corresponds to the phase of the characteristic curve having the greatest slope, as indicated by tan in FIG. 1. As the input pressure $p_E$ increases during the braking process, with corresponding deceleration of the vehicle, the required output brake pressure $p_A$ to be provided by the pressure regulator 5 toward the rear axle is reduced somewhat by the dynamic displacement of axle load produced by the braking, and thus the ideal characteristic line which relates the input pressure $p_E$ to the output pressure $p_A$ becomes nonlinear, as can be noted in FIG. 1. With a further increase of the input pressure $p^E$ from the master cylinder 31, the spring beam 6 starts to bend and the support point of the spring beam 6 on the curvature 7 beings its continuous displacement in the direction of the actuating piston 11, which is equivalent to a continuous change of the output lever ratio. As a result, the output pressure $p_A$ from the pressure regulator increases nonlinearly in relation to the input pressure $p_E$. As seen in FIG. 2, the control piston 24 which actuates the control valve 17 reduces the increasing input pressure $p_E$ on the actuating piston 11 to a reduced output pressure $p_A$, which increases continuously, but with a decreasing rate of increase. The control piston acts on the control valve 17 so as to provide for increase in the output pressure $p_A$ only by the reciprocal of the changing lever ratio. Upon an increase in the input braking pressure $p_E$ above the vehicle characteristic point, the spring beam 6 fits itself to the curvature 7 of the support 8 and comes to rest thereon. The lever ratio L/a (see FIG. 1) increases toward infinity and there is no longer any increase in the output pressure $p_A$. Thus the characteristic curve (see FIG. 1) asymptotically approaches the horizontal.

Upon the termination of the braking process, when the hydraulic pressure in the front-axle line 30 and in the master cylinder 31 decreases, the valve body 21 of the control valve 17 of the regulator 5 is lifted by the residual pressure in the rear-axle line 32, to open the valve, assuming $p_E \leq p_A$, whereby the output pressure $p_A$ in the rear-axle line 32 is decreased.

Figure 4:
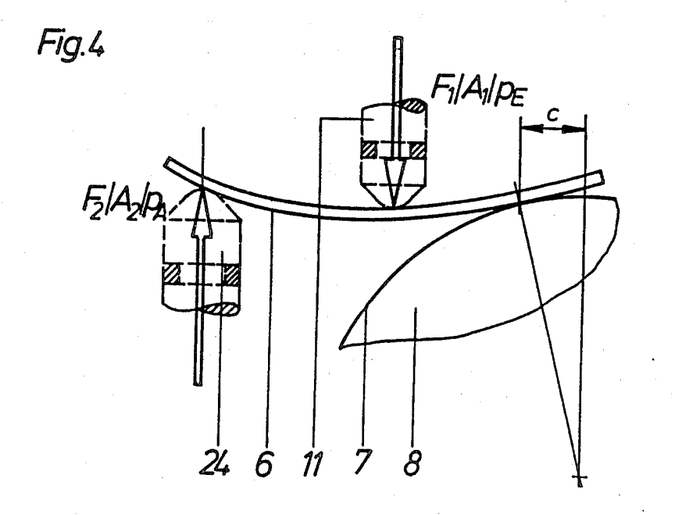
FIG. 4 is a simplified diagram of a second embodiment of a brake pressure regulator according to the invention.
Figure 5:
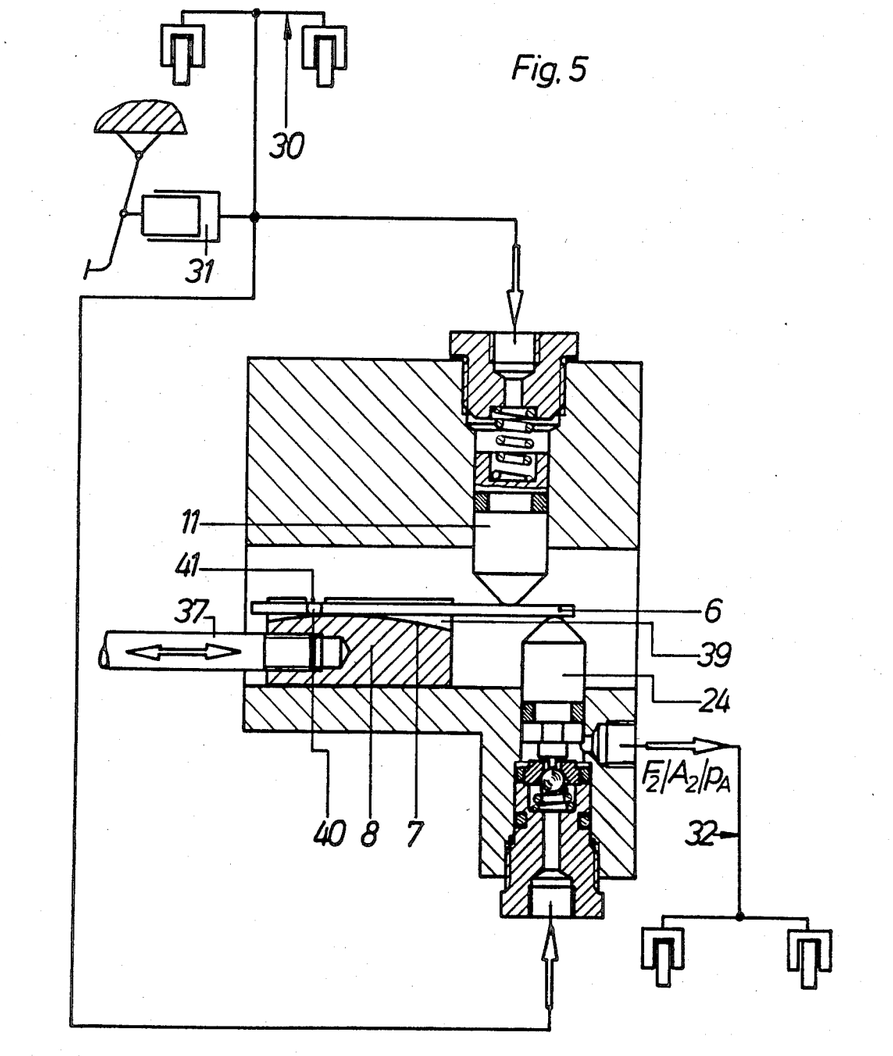
FIG. 5 is a cross-sectional view of the second embodiment.

FIGS. 4 and 5 show a second embodiment of a brake pressure regulator according to the invention. In this case, the spring beam 6 lies, at one end, on an upper end of the control piston 24, and at its other end on the curved surface 7 of the support 8. Both of these serve as supporting elements while the actuating piston 11, which is disposed between them on the opposite (upper) side of the spring beam 6, concavely deforms the spring beam 6 upon actuation by pressure resulting from a braking process. By the tangential rolling produced thereby of the two opposed lines of curvature of the spring beam 6 and the curved surface 7 of the support 8, the active lever lengths are changed in the manner described previously and produce the function which has been explained. In contradistinction to the arrangement in FIG. 2 (with convex deformation of the spring beam 6 with respect to the arched curved surface 7 of the support 8, in which both lever arms a and b change), in this case only one lever arm changes, between the piston 11 and the support 8, upon action of pressure on the actuating piston 11. A further difference from the arrangement in FIGS. 2 and 3 is that the condition $p_A \geq p_F$ is of no importance. However, the aforementioned equations apply for determining the dimensioning of the functional elements and their arrangement.

As an alternate arrangement for securing of the spring beam 6 is seen in FIG. 5, in which the spring beam 6 is movably fastened to the support 8 and moves laterally with the support 8 upon setting thereof by the pivot device 37. On the support 8 the spring beam 6 is held in direction of displacement by a generally horizontal guide slot 39 and held against excessive horizontal movement by one or more trunnions 40 formed on the spring beam 6 and loosely held in corresponding depressions 41 in the sides of the slot 39. The degrees of freedom necessary for functioning upon the deformation of the force-loaded spring beam 6 are thereby retained.

In another alternate arrangement, not shown in detail herein, the actuating piston 11 and control piston 24 would be interchanged. Such arrangement would be functionally similar to the arrangements previously set forth.

Figure 6:
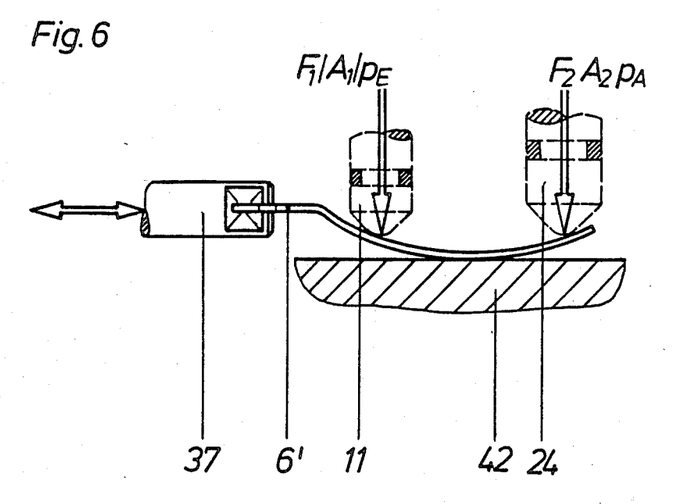
FIG. 6 is a simplified diagram of a third embodiment of a brake pressure regulator according to the invention.

FIG. 6 shows a third embodiment wherein the functions of the above-described spring beam 6 and support 8 are combined in a single-part rolling spring element 6'. In this case the rolling spring element 6' is itself formed with a curvature similar to the curvature 7 of the support 8; and is laterally displaced by the pivot device 37, as a function of load, along a flat guide path 42 and the pistons 11, 24 which rest on one side of the spring beam 6. The rolling spring element 6' is freely movable vertically against the guide plane and is secured with respect to horizontal movement to the pivoting device 37 so that the actuating piston 11 and the rolling spring element 6' have the required length of stroke.

Although the invention has been described in connection with preferred embodiments thereof, many other variations and modifications may occur to those skilled in the art. It is to be understood, therefore, that the present invention is to be defined not by the specific disclosure herein, but only by the appended claims.

What is claimed is:

1. A load-distribution-dependent hydraulic brake pressure regulator for a vehicle, comprising:
    (a) housing means;
    (b) receiving means in the housing means for receiving pressurized hydraulic fluid from a master cylinder;
    (c) transmitting means in the housing means for transmitting pressurized hydraulic fluid to a brake line;
    (d) valve means for controllably intercommunicating the receiving means and the transmitting means to control the pressure of such transmitted hydraulic fluid;
    (e) actuating piston means for receiving pressurized fluid from the receiving means and generating a first force in response thereto;

(f) balance beam means including a spring beam and a support, said support providing an extended support surface which extends along the length of said spring beam to provide a variable fulcrum point for the spring beam, the location of said fulcrum point varying continuously along the length of the spring beam according to the magnitude of such first force, said balance beam means receiving such first force and generating in response a second force;

(g) control piston means for receiving such second force and transmitting such second force to the valve means for controlling the same; and (h) adjustment means for receiving information indicative of the vehicle load distribution and automatically changing the relative position of the support with respect to the length of the spring beam in response to said information, such that such second force is related to such first force and to such vehicle load distribution according to a predetermined function corresponding to a degressive curve, wherein said function provides that said brake line pressure will increase as a function of said pressure in said master cylinder, but with a rate of increase of brake line pressure which continuously decreases as said master cylinder pressure increases, the spring beam and the support surface being shaped to determine the predetermined function.

2. A regulator as in claim 1, wherein the support is movable in response to vehicle load distribution.

3. A regulator as in claim 2, wherein the support has a curved active surface for engaging the spring beam.

4. A regulator as in claim 3, wherein the spring beam is attached to the support for movement therewith in response to vehicle load distribution.

5. A regulator as in claim 4, wherein the spring beam has trunnion means thereon and the support has notch means for loosely accommodating the trunnion means to provide for movement of the spring beam with the support.

6. A regulator as in claim 3, wherein
the actuating piston means and the control piston means include respectively an actuating piston and a control piston which engage the spring beam at respective points on one side thereof, and
the spring beam engages the support at a point between the engagement points of the two pistons on an opposite side of the spring beam from such engagement points,
whereby such first force and such second force are in generally opposite directions.

7. A regulator as in claim 3, wherein
the actuating piston means and the control piston means include respectively an actuating piston and a control piston which engage the spring beam at respective points on opposite sides thereof, one of the pistons engaging the spring beam at a point between the engagement points of the support and of the other piston,
whereby such first force and such second force are generally in the same direction.

8. A regulator as in claim 1, wherein the support is substantially flat and the spring beam is curved for rolling engagement therewith.

9. A regulator as in claim 8, wherein
the actuating piston means and the control piston means include respectively an actuating piston and a control piston which engage the spring beam at respective points on one side thereof, and
the spring beam engages the support at a point between the engagement points of the two pistons on an opposite side of the spring beam from such engagement points,
whereby such two forces are in generally opposite directions.

10. A load-distribution-dependent hydraulic brake pressure regulator for a vehicle, comprising:

(a) valve means operable to control an output brake pressure in a vehicle as a function of an input brake pressure;

(b) actuating piston means for receiving such input brake pressure and generating a first force in response thereto;

(c) balance beam means including a spring beam and a support, said support providing an extended support surface which extends along the length of said spring beam to provide a variable fulcrum point for the spring beam, the location of said fulcrum point varying continuously along the length of the spring beam according to the magnitude of such first force, said balance beam means receiving such first force and generating a second force in response thereto;

(d) control piston means for receiving such second force and transmitting such second force to the valve means for controlling the same; and (e) adjustment means for automatically changing the relative position of the support with respect to the length of the spring beam in response to the vehicle load distribution such that such second force is related to such first force and to such vehicle load distribution according to a predetermined function corresponding to a degressive curve, wherein said function provides that said output brake pressure will increase as a function of said input brake pressure, but with a rate of increase of brake line pressure which decreases as said input brake pressure increases, the spring beam and the support being shaped to determine the predetermined function.

11. A load-distribution-dependent hydraulic brake pressure regulator for a vehicle, comprising:

(a) actuating piston means for receiving an input brake pressure and in response generating a first force;

(b) balance beam means including a spring beam and a support, said support providing an extended support surface which extends along the length of said spring beam to provide a variable fulcrum point for the spring beam, the location of said fulcrum point varying continuously along the length of the spring beam according to the magnitude of such first force, said balance beam means being adjustable by changing the relative position of the support with respect to the length of the spring beam in response to the vehicle load distribution, for receiving such first force and in response generating a second force, said second force being related to such vehicle load distribution according to a predetermined function corresponding to a degressive curve, the spring beam and the support being shaped to determine the predetermined function; and (c) control piston means for receiving such second force and in response generating an output brake pressure, (d) wherein said function provides that said output brake pressure will increase as a function of said input brake pressure, but with a rate of increase of brake line pressure which decreases as said input brake pressure increases.

* * * * *